(12) United States Patent
Liu et al.

(10) Patent No.: US 10,102,720 B2
(45) Date of Patent: Oct. 16, 2018

(54) VEHICLE ALARMING METHOD, DEVICE, AND STORAGE MEDIUM

(71) Applicant: Xiaomi Inc., Beijing (CN)

(72) Inventors: Xinyu Liu, Beijing (CN); Tong Zhao, Beijing (CN)

(73) Assignee: Xiaomi Inc., Beijing (CN)

(*) Notice: Subject to any disclaimer, the term of this patent is extended or adjusted under 35 U.S.C. 154(b) by 0 days.

(21) Appl. No.: 15/211,336

(22) Filed: Jul. 15, 2016

(65) Prior Publication Data

US 2017/0103624 A1    Apr. 13, 2017

(30) Foreign Application Priority Data

Oct. 13, 2015  (CN) .......................... 2015 1 0660852

(51) Int. Cl.
| | |
|---|---|
| *B60Q 1/00* | (2006.01) |
| *G08B 3/10* | (2006.01) |
| *B60Q 1/26* | (2006.01) |
| *B60Q 5/00* | (2006.01) |
| *H04W 4/00* | (2018.01) |
| *H04W 76/02* | (2009.01) |
| *G08B 21/24* | (2006.01) |
| *G08B 19/00* | (2006.01) |

(Continued)

(52) U.S. Cl.
CPC .............. *G08B 3/1016* (2013.01); *B60Q 1/26* (2013.01); *B60Q 5/005* (2013.01); *G08B 19/00* (2013.01); *G08B 21/24* (2013.01); *H04W 4/008* (2013.01); *H04W 4/80* (2018.02); *H04W 76/023* (2013.01); *H04W 76/14* (2018.02)

(58) Field of Classification Search
CPC ...... G08B 13/1427; G08B 3/10; G08B 21/22; B60C 23/0408; B62B 7/044; B62B 7/08
USPC ........... 340/539.23, 540, 426.33, 666, 573.1; 280/47.38, 650
See application file for complete search history.

(56) References Cited

U.S. PATENT DOCUMENTS 4,853,692 A * 8/1989 Wolk ..................... G08B 13/14
340/539.1
5,936,530 A * 8/1999 Meinhold ............ G08B 21/028
340/539.1

(Continued)

FOREIGN PATENT DOCUMENTS

| CN | 203111266 U | 8/2013 |
|---|---|---|
| CN | 103325197 A | 9/2013 |

(Continued)

OTHER PUBLICATIONS

International Search Report of International Application No. PCT/CN2015/099058, issued by the State Intellectual Property Office of P.R. China as the ISA, dated Jun. 28, 2016 (12 pages).

(Continued)

*Primary Examiner* — Firmin Backer
*Assistant Examiner* — Munear Akki
(74) *Attorney, Agent, or Firm* — Finnegan, Henderson, Farabow, Garrett & Dunner LLP (57) ABSTRACT

A vehicle alarming method includes measuring a pressure value of a vehicle through a pressure sensor, detecting whether a paired terminal corresponding to the vehicle is within a preset distance range when the pressure value of the vehicle is reduced to a preset pressure range, and performing alarming when the paired terminal is not detected.

13 Claims, 6 Drawing Sheets

(51) Int. Cl.
*H04W 76/14* (2018.01)
*H04W 4/80* (2018.01)

(56) References Cited

U.S. PATENT DOCUMENTS

| | | | |
|---|---|---|---|
| 6,992,588 B1* | 1/2006 | Santosstefano | B62B 9/00 |
| | | | 119/770 |
| 2004/0239508 A1* | 12/2004 | Kaneko | G08B 21/0202 |
| | | | 340/573.4 |
| 2005/0219052 A1* | 10/2005 | Chaco | G07C 1/10 |
| | | | 340/572.1 |
| 2005/0280546 A1* | 12/2005 | Ganley | G08B 13/1427 |
| | | | 340/573.4 |
| 2005/0283286 A1 | 12/2005 | Kanda et al. | |
| 2011/0234397 A1* | 9/2011 | Fetzer | G08B 21/0261 |
| | | | 340/539.13 |
| 2013/0014790 A1* | 1/2013 | Van Gerpen | A61H 3/04 |
| | | | 135/66 |
| 2013/0088344 A1* | 4/2013 | Rose | B62B 9/00 |
| | | | 340/438 |
| 2015/0109126 A1* | 4/2015 | Crawford | G08B 21/0269 |
| | | | 340/539.13 |

FOREIGN PATENT DOCUMENTS

| | | |
|---|---|---|
| CN | 103536284 A | 1/2014 |
| CN | 203372281 U | 1/2014 |
| CN | 103786608 A | 5/2014 |
| CN | 203706355 U | 7/2014 |
| CN | 203766861 U | 8/2014 |
| CN | 204087428 U | 1/2015 |
| CN | 104326011 A | 2/2015 |
| CN | 204256893 U | 4/2015 |
| CN | 104637262 A | 5/2015 |
| GB | 2 270 786 A | 3/1994 |
| GB | 2 382 205 A | 5/2003 |
| JP | 2002159056 A | 5/2002 |
| JP | 2002279556 A | 9/2002 |
| JP | 2003233877 A | 8/2003 |
| JP | 2006146654 A | 6/2006 |
| JP | 2006333353 A | 12/2006 |
| JP | 2007230550 A | 9/2007 |
| JP | 4036194 B2 | 1/2008 |
| JP | 2008052480 A | 3/2008 |
| JP | 2008252798 A | 10/2008 |
| JP | 2008307969 A | 12/2008 |
| JP | 2011197973 A | 10/2011 |
| JP | 2014021676 A | 2/2014 |
| JP | 2014049065 A | 3/2014 |
| KR | 20090122577 A | 12/2009 |

OTHER PUBLICATIONS

Office Action in counterpart Chinese Application No. 201510660852.8, dated May 2, 2017 and English translation thereof.
Extended European Search report for Application No. 16163443.1-1810, from the European Patent Office, dated Mar. 16, 2017.
English version of International Search Report of International Application No. PCT/CN2015/099058, issued by the State Intellectual Property Office of P.R. China as the ISA, dated Jun. 28, 2016.
International Preliminary Report on Patentability of PCT Application No. PCT/CN2015/099058, dated Apr. 17, 2018.

* cited by examiner

VEHICLE ALARMING METHOD, DEVICE, AND STORAGE MEDIUM

This application claims the priority of Chinese patent application No. 201510660852.8 filed on Oct. 13, 2015, the entire contents of which are incorporated herein by reference.

TECHNICAL FIELD

The present disclosure relates to network communication and, more particularly, to a vehicle alarming method, device, and storage medium.

BACKGROUND

Strollers are widely used by parents of infants for outdoor activities. Many strollers are equipped with, for example, anti-shock devices, brakes, and height adjustment devices to improve safety. However, when a parent is away from a stroller, the infant in the stroller can be in danger. For example, the infant may be taken away by others.

SUMMARY

In accordance with the present disclosure, there is provided a vehicle alarming method including measuring a pressure value of a vehicle through a pressure sensor, detecting whether a paired terminal corresponding to the vehicle is within a preset distance range when the pressure value of the vehicle is reduced to a preset pressure range, and performing alarming when the paired terminal is not detected.

Also in accordance with the present disclosure, there is provided a vehicle alarming device including a processor and a memory storing instructions. The instructions, when executed by the processor, cause the processor to measure a pressure value of a vehicle through a pressure sensor, detect whether a paired terminal corresponding to the vehicle is within a preset distance range when the pressure value of the vehicle is reduced to a preset pressure range, and perform alarming when the paired terminal is not detected.

Also in accordance with the present disclosure, there is provided a non-transitory computer-readable storage medium having stored therein instructions that, when executed by a processor of a vehicle alarming device installed on a vehicle, cause the device to measure a pressure value of the vehicle through a pressure sensor, detect whether a paired terminal corresponding to the vehicle is within a preset distance range when the pressure value of the vehicle is reduced to a preset pressure range, and perform alarming when the paired terminal is not detected.

It should be understood that both the foregoing general description and the following detailed description are only exemplary and explanatory and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the invention as recited in the appended claims.

The terms used in this disclosure are only intended to describe the specific embodiments rather than to limit this disclosure. Terms such as "a/an," "the," and "said" in single forms used in this disclosure and the appended claims are also intended to include plural forms, unless clearly specified otherwise in the context. It should be noted that, the term "and/or" used herein includes any or all possible combinations of one or more related listed items.

It should be noted that although terms such as "first," "second," and "third" are used to describe various information in this disclosure, such information shall not be limited to these terms. These terms are only used to distinguish information of the same type. For example, when not departing from the scope of this disclosure, first information may also be named as second information, and vice versa. Depending on the context, the word "if" used herein may be interpreted as "when" or "determining that . . . in response to."

Figure 1:
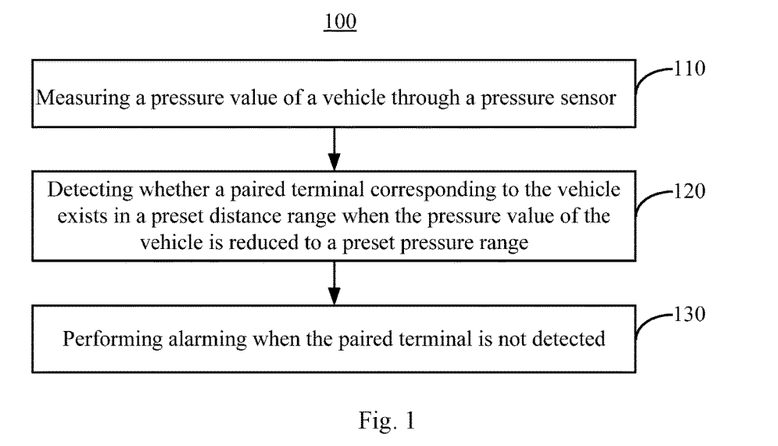
FIG. 1 is a flow chart showing a vehicle alarming method according to an exemplary embodiment of the disclosure.

FIG. 1 is a flow chart showing a vehicle alarming method 100 according to an exemplary embodiment. The method 100 can be implemented in a vehicle, such as a stroller. As shown in FIG. 1, at 110, a pressure value of the vehicle is measured through a pressure sensor. In some embodiments, the pressure sensor can be mounted on the vehicle to measure the pressure value of the vehicle, so that whether a person or an article in the vehicle is missing can be determined according to the change of the vehicle pressure value. The pressure sensor can be mounted on a wheel of the vehicle, on the cabin of the vehicle, or the like. For example, if the vehicle is a stroller, the weight change of an infant sitting in the stroller can be measured by the pressure sensor.

At 120, whether a paired terminal corresponding to the vehicle is within a preset distance range is detected when the pressure value of the vehicle is reduced to a preset pressure range. In some embodiments, the preset pressure range is set according to the weight of the person or the article in the vehicle. When the pressure value of the vehicle is reduced to the preset pressure range, which means the person or the article may have left the vehicle, whether a keeper of the vehicle is near the vehicle needs to be detected. Thus, an intelligent communication module can be mounted on the vehicle. The intelligent communication module is coupled with the pressure sensor and the paired terminal. The paired terminal can be carried by the keeper and can be used to represent the keeper.

The intelligent communication module, generally in a dormant state, can be activated when the pressure value of the vehicle measured by the pressure sensor is reduced to the preset pressure range, and can then detect whether the paired terminal corresponding to the vehicle is within the preset distance range. The preset distance range can be set according to an actual situation, for example, as 10 meters.

Whether the paired terminal corresponding to the vehicle is within the preset distance range can be detected using various approaches, such as, for example, through Bluetooth or wireless fidelity (Wi-Fi). In some embodiments, the preset distance range can be set according to the adopted communication technology. For example, if Bluetooth is used, the preset distance range can be set to be 10 meters, since the detection distance of Bluetooth is about 10 meters.

When the paired terminal is detected, which means the keeper of the vehicle is nearby, an alarm sound may not be needed. Alternatively, only a reminder message is sent to the keeper. When the paired terminal is not detected, which means the keeper of the vehicle is not nearby, alarming is needed.

For example, if a stroller is 10 kg and an infant in the stroller is 10 kg, a preset pressure range can be set between 10-14 kg according to this actual situation. When it is detected that the pressure value of the stroller is between 10-14 kg, which indicates the infant in the stroller may have been taken away or fallen out of the stroller, whether a keeper of the infant is near the stroller is determined by detecting whether a paired terminal corresponding to the stroller is within a preset distance range.

At 130, alarming is performed when the paired terminal is not detected. The alarm can be, for example, an alarming sound, an alarming message sent to the paired terminal, or both an alarming sound and an alarming message sent to the paired terminal.

In some embodiments, before the pressure value of the vehicle is detected, the vehicle needs to be paired with at least one preset terminal, and a preset terminal after being paired serves as the paired terminal corresponding to the vehicle. The paired terminal can be, for example, a smart phone, or a wearable smart device, such as a smart bracelet.

As described above, the pressure value of the vehicle can be measured through a pressure sensor arranged on the wheel of the vehicle, also referred to herein as a wheel pressure sensor, or a pressure sensor arranged on the cabin of the vehicle, also referred to herein as a cabin pressure sensor. The wheel pressure sensor can measure an entire load of the whole vehicle. In this scenario, the entire load of the whole vehicle is used as the pressure value of the vehicle. On the other hand, the cabin pressure sensor can measure a load of the cabin only. In this scenario, the load of the cabin is used as the pressure value of the vehicle. In the above two scenarios, the preset pressure range can be different. When the wheel pressure sensor is used to determine the pressure value, the weight of the whole vehicle and the weight of the person or article need to be taken into consideration. When the cabin pressure sensor is used to determine the pressure value, the weight of the cabin and the weight of the person or article need to be taken into consideration.

Figure 2:
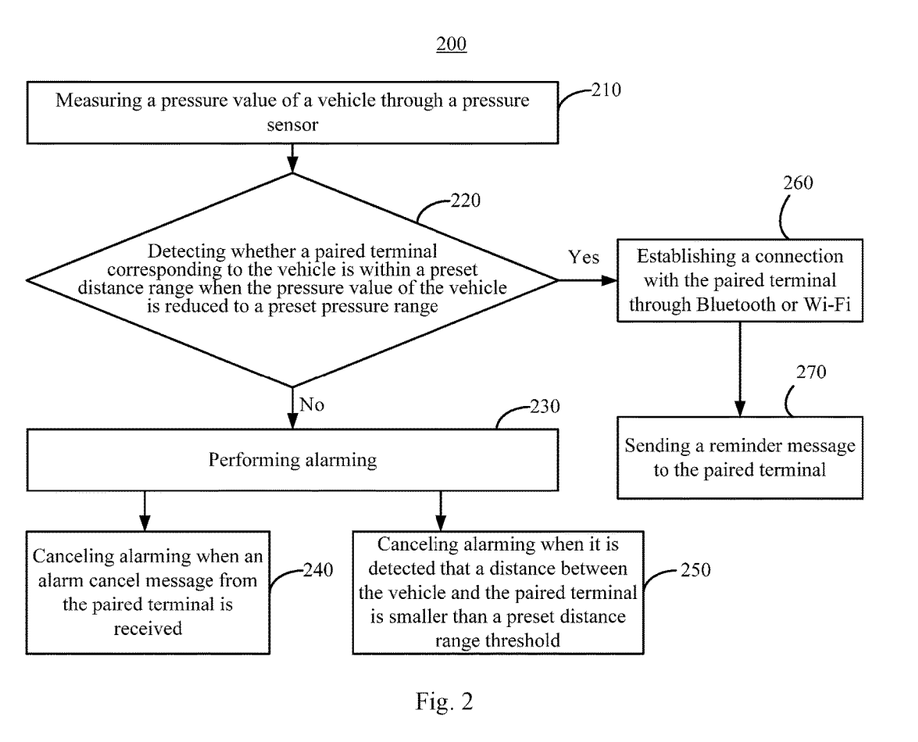
FIG. 2 is a flow chart showing a vehicle alarming method according to another exemplary embodiment of the disclosure.

FIG. 2 is a flow chart showing a vehicle alarming method 200 according to another exemplary embodiment of the disclosure. The method 200 can be implemented in a vehicle, such as a stroller. As shown in FIG. 2, at 210, a pressure value of the vehicle is measured through a pressure sensor.

At 220, whether a paired terminal corresponding to the vehicle is within a preset distance range is detected when the pressure value of the vehicle is reduced to a preset pressure range. When the paired terminal is not detected (220: No), 230 is performed. When the paired terminal is detected (220: Yes), 260 is performed.

At 230, alarming is performed. In some embodiments, alarming can be performed by sounding an alarm and/or sending an alarming message to the paired terminal through a mobile network or the Internet.

At 240, alarming is canceled when an alarm cancel message from the paired terminal is received. The alarm cancel message from the paired terminal may indicate the keeper of the vehicle may have removed the security risk of the person or the article, and thus alarming can be canceled under the instruction of the keeper.

At 250, alarming is canceled when it is detected that a distance between the vehicle and the paired terminal becomes smaller than a preset distance range threshold. The preset distance range threshold can be set according to an actual situation, for example, to be one meter. When it is detected that the distance between the vehicle and the paired terminal is smaller than the preset distance range threshold, e.g., one meter, which indicates that the keeper of the vehicle is now close to the vehicle, continuous alarming becomes unnecessary, and thus alarming can be canceled.

At 260, a connection with the paired terminal is established through Bluetooth or Wi-Fi.

At 270, a reminder message is sent to the paired terminal.

Figure 3:
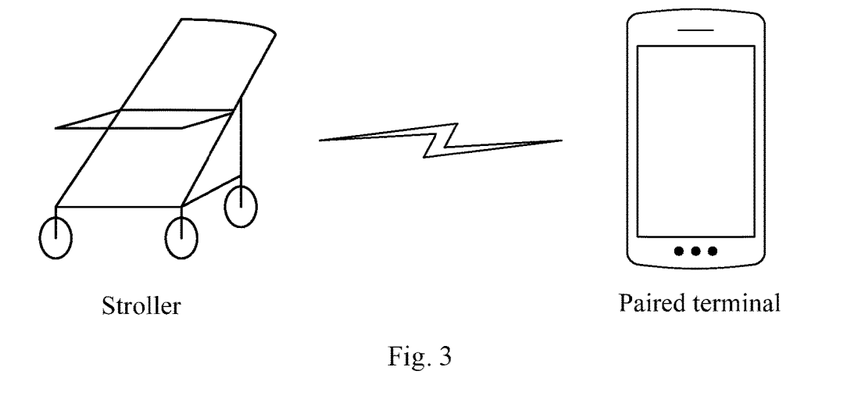
FIG. 3 is an application scene for a vehicle alarming method according to an exemplary embodiment of the disclosure.

FIG. 3 is an application scene for a vehicle alarming method according to an exemplary embodiment of the disclosure. As shown in FIG. 3, the application scene includes a stroller and a paired terminal corresponding to the stroller.

A pressure sensor, an intelligent communication module, and an alarming module are mounted on the stroller. The pressure sensor is configured to measure a pressure value of the stroller. As described above, the pressure sensor can be mounted on a wheel of the stroller and thus measures the entire load of the whole stroller as the pressure value of the stroller, or can be mounted on the body, i.e., the cabin, of the stroller and thus measures the load of the body of the stroller as the pressure value of the stroller. The intelligent communication module is configured to detect whether the paired terminal is within a preset distance range. The alarming module is configured to perform alarming when the paired terminal is not detected.

A detailed implementation in the application scene shown in FIG. 3 is similar to exemplary methods described above in connection with FIGS. 1 and 2, and thus is not repeated here.

Figure 4:
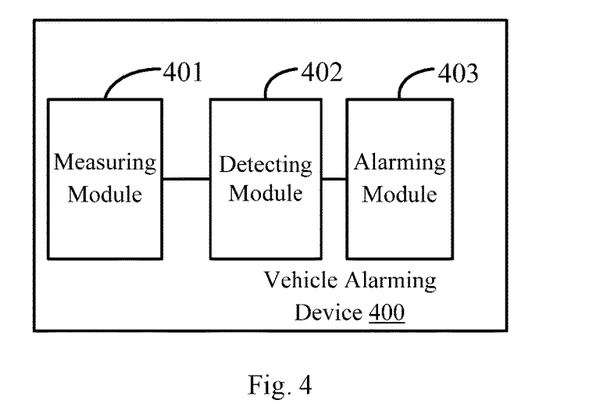
FIG. 4 is a block diagram of a vehicle alarming device according to an exemplary embodiment of the disclosure.

FIG. 4 is a block diagram of a vehicle alarming device 400 according to an exemplary embodiment of the disclosure. The device 400 can be used in a vehicle, such as a stroller, and is configured to perform a vehicle alarming method consistent with the present disclosure, such as one of the exemplary methods described above in connection with FIGS. 1 and 2. As shown in FIG. 4, the device 400 includes a measuring module 401, a detecting module 402, and an alarming module 403. The measuring module 401 is configured to measure a pressure value of the vehicle through a pressure sensor. The detecting module 402 is configured to detect whether a paired terminal corresponding to the vehicle is within a preset distance range when the pressure value of the vehicle measured by the measuring module 401 is reduced to a preset pressure range. The paired terminal can be, for example, a smart phone or a wearable smart device. The alarming module 403 is configured to perform alarming when the paired terminal is not detected.

Figure 5:
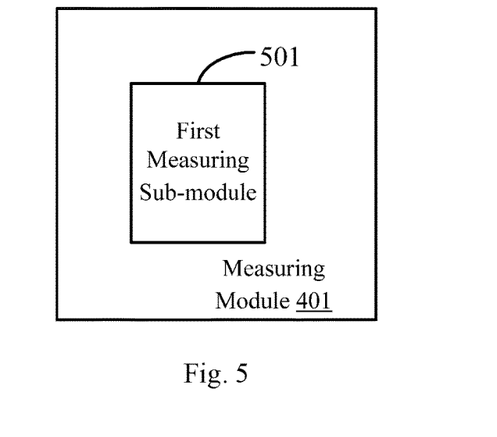
FIG. 5 is a block diagram of an example of the measuring module shown in FIG. 4.

FIG. 5 is a block diagram showing an example of the measuring module 401. As shown in FIG. 5, the measuring module 401 includes a first measuring sub-module 501 configured to detect an entire load of the whole vehicle through a wheel pressure sensor arranged on a wheel of the vehicle. The entire load of the whole vehicle serves as a first pressure value of the vehicle.

Figure 6:
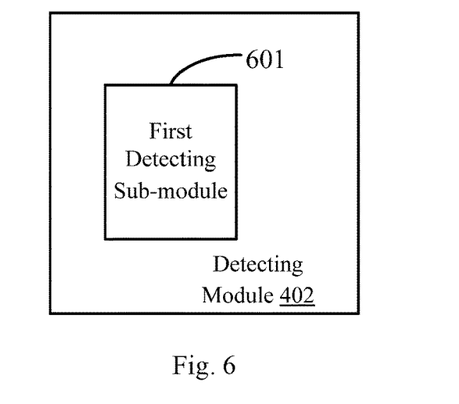
FIG. 6 is a block diagram of an example of the detecting module shown in FIG. 4.

FIG. 6 is a block diagram showing an example of the detecting module 402. As shown in FIG. 6, the detecting module 402 includes a first detecting sub-module 601 configured to detect whether the paired terminal corresponding to the vehicle is within the preset distance range when the first pressure value of the vehicle is reduced to a first preset pressure range. The first preset pressure range corresponds to the wheel pressure sensor, and is set taking into consideration a weight of the vehicle and a weight of a person or an article in the vehicle.

Figure 7:
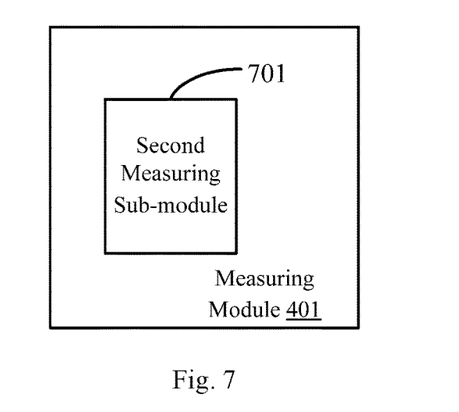
FIG. 7 is a block diagram of another example of the measuring module shown in FIG. 4.

FIG. 7 is a block diagram showing another example of the measuring module 401. As shown in FIG. 7, the measuring module 401 includes a second measuring sub-module 701 configured to detect a load of the cabin of the vehicle through a cabin pressure sensor arranged on the cabin. The load of the cabin serves as a second pressure value of the vehicle.

Figure 8:
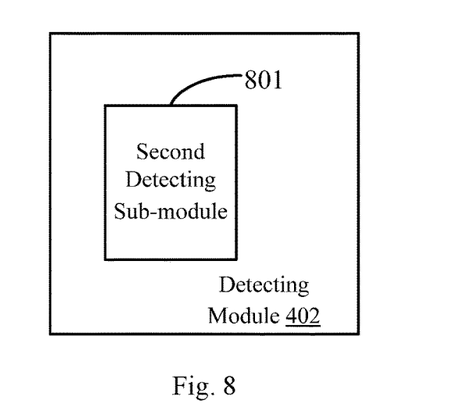
FIG. 8 is a block diagram of another example of the detecting module shown in FIG. 4.

FIG. 8 is a block diagram showing another example of the detecting module 402. As shown in FIG. 8, the detecting module 402 includes a second detecting sub-module 801 configured to detect whether the paired terminal corresponding to the vehicle is within the preset distance range when the second pressure value of the vehicle is reduced to a second preset pressure range. The second preset pressure range corresponds to the cabin pressure sensor, and is set taking into consideration a weight of the cabin and a weight of the person or the article in the cabin.

In some embodiments, the detecting module 402, the first detecting sub-module 601, or the second detecting sub-module 801 is further configured to detect whether the paired terminal corresponding to the vehicle is within the preset distance range through Bluetooth or wireless fidelity (Wi-Fi).

Figure 9:
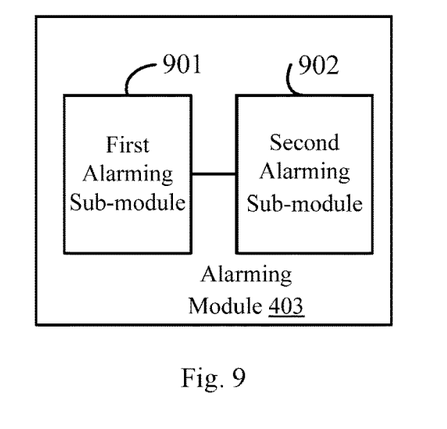
FIG. 9 is a block diagram of an example of the alarming module shown in FIG. 4.

FIG. 9 is a block diagram showing an example of the alarming module 403. As shown in FIG. 9, the alarming module 403 includes a first alarming sub-module 901 and/or a second alarming sub-module 902. The first alarming sub-module 901 is configured to perform alarming by sounding an alarm. The second alarming sub-module 902 is configured to send an alarming message to the paired terminal through a mobile network or the Internet.

Figure 10:
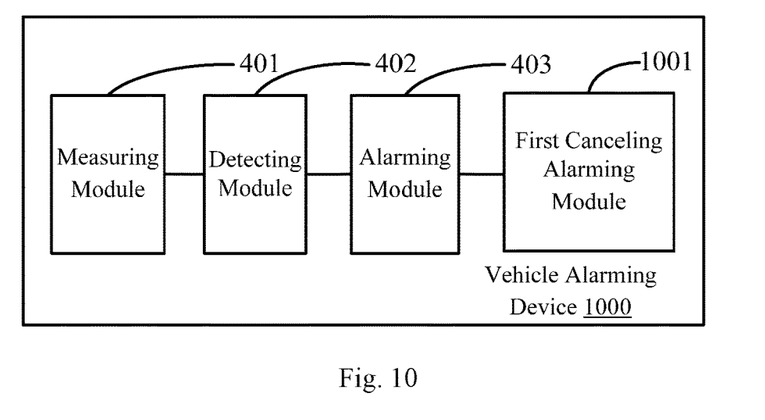
FIG. 10 is a block diagram of a vehicle alarming device according to another exemplary embodiment of the disclosure.

FIG. 10 is a block diagram of a vehicle alarming device 1000 according to another exemplary embodiment of the disclosure. As shown in FIG. 10, the device 1000 includes the measuring module 401, the detecting module 402, the alarming module 403, and a first alarm canceling module 1001. The first alarm canceling module 1001 is configured to cancel alarming when an alarm cancel message from the paired terminal is received.

Figure 11:
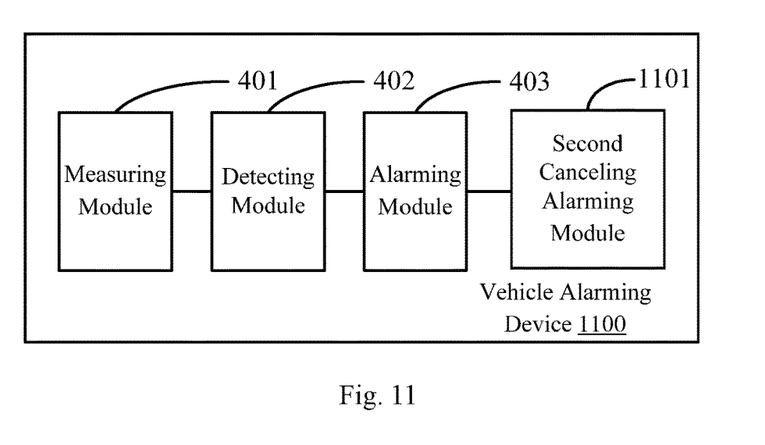
FIG. 11 is a block diagram of a vehicle alarming device according to another exemplary embodiment of the disclosure.

FIG. 11 is a block diagram of a vehicle alarming device 1100 according to another exemplary embodiment of the disclosure. As shown in FIG. 11, the device 1100 includes the measuring module 401, the detecting module 402, the alarming module 403, and a second alarm canceling module 1101. The second alarm canceling module 1101 is configured to cancel alarming when it is detected that the distance between the vehicle and the paired terminal is smaller than a preset distance range threshold.

Figure 12:
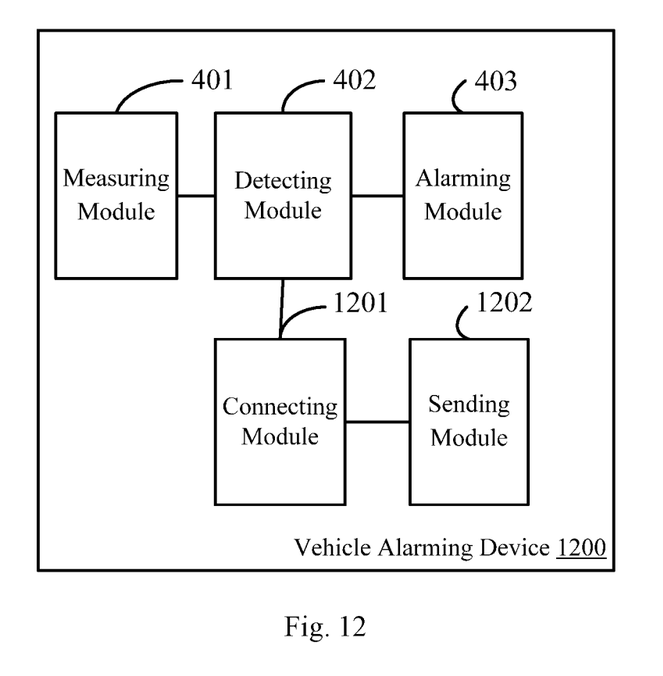
FIG. 12 is a block diagram of a vehicle alarming device according to another exemplary embodiment of the disclosure.

FIG. 12 is a block diagram of a vehicle alarming device 1200 according to another exemplary embodiment of the disclosure. As shown in FIG. 12, the device 1200 includes the measuring module 401, the detecting module 402, the alarming module 403, a connecting module 1201, and a sending module 1202. The connecting module 1201 is configured to establish a connection with the paired terminal through Bluetooth or wireless fidelity (Wi-Fi) when the paired terminal is detected. The sending module 1202 is configured to send a reminder message to the paired terminal via the connection.

Figure 13:
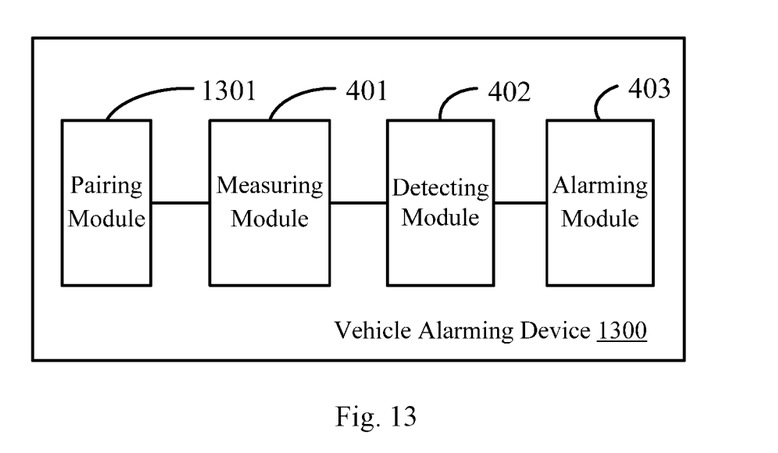
FIG. 13 is a block diagram of a vehicle alarming device according to another exemplary embodiment of the disclosure.

FIG. 13 is a block diagram of a vehicle alarming device 1300 according to another exemplary embodiment of the disclosure. As shown in FIG. 13, the device 1300 includes the measuring module 401, the detecting module 402, the alarming module 403, and a pairing module 1301. The pairing module 1301 is configured to perform pairing with at least one preset terminal. A preset terminal, after being paired, serves as the paired terminal corresponding to the vehicle.

According to the present disclosure, there is provided a vehicle alarming device including a processor and a memory storing instructions that, when executed by the processor, cause the processor to perform a vehicle alarming method consistent with the present disclosure, such as one of the exemplary methods described above.

Figure 14:
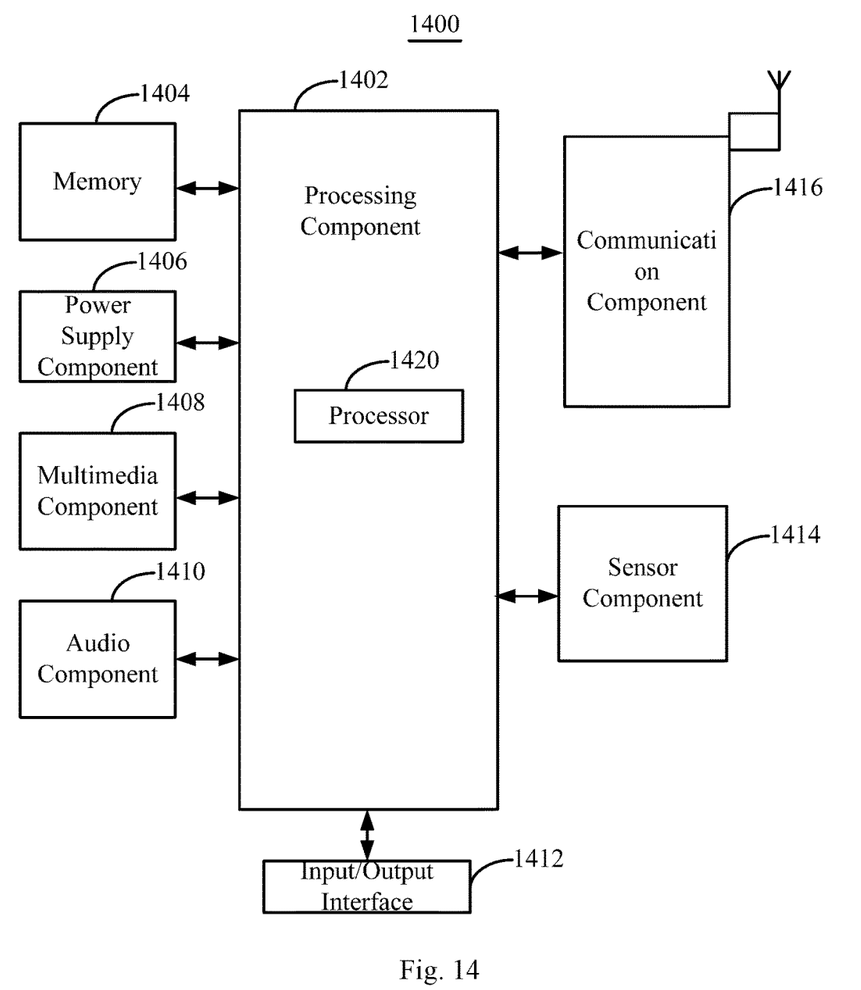
FIG. 14 is a schematic diagram illustrating a vehicle alarming device according to another exemplary embodiment of the disclosure.

FIG. 14 is a schematic diagram illustrating a vehicle alarming device 1400 according to another exemplary embodiment of the disclosure. The vehicle alarming device 1400 may be an electronic module or a terminal, such as a mobile phone with a routing function, a computer, a digital broadcast terminal, a message transceiver, a game console, a tablet device, a medical device, fitness equipment, a personal digital assistant, or the like.

Referring to FIG. 14, the vehicle alarming device 1400 may include one or more following components: a processing component 1402, a memory 1404, a power supply component 1406, a multimedia component 1408, an audio component 1410, an input/output (I/O) interface 1412, a sensor component 1414, and a communication component 1416.

The processing component 1402 typically controls overall operations of the vehicle alarming device 1400, such as the operations associated with display, telephone calls, data communications, camera operations, and/or recording operations. The processing component 1402 may include one or more processors 1420 to execute instructions to perform part or all of a method consistent with the present disclosure, such as one of the above-described exemplary methods. Moreover, the processing component 1402 may include one or more modules which facilitate the interaction between the processing component 1402 and other components. For example, the processing component 1402 may comprise a multimedia module to facilitate the interaction between the multimedia component 1408 and the processing component 1402.

The memory 1404 is configured to store various types of data to support the operation of the vehicle alarming device 1400. Examples of such data include instructions for any applications or methods operated on the vehicle alarming device 1400, contact data, phonebook data, messages, pictures, video, etc. The memory 1404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 1406 provides power to various components of the paired terminal 1400. The power supply component 1406 may include a power supply management system, one or more power sources, and any other components associated with the generation, management, and distribution of power in the paired terminal 1400.

The multimedia component 1408 includes a screen providing an output interface between the vehicle alarming device 1400 and the user. In some embodiments, the screen may include a liquid crystal display (LCD) and a touch panel. If the screen includes the touch panel, the screen may be implemented as a touch screen to receive input signals from the user. The touch panel includes one or more touch sensors to sense touches, swipes and gestures on the touch panel. The touch sensors may not only sense a boundary of a touch or swipe action, but also sense a period of time and a pressure associated with the touch or swipe action. In some embodiments, the multimedia component 1408 includes a front camera and/or a rear camera. The front camera and/or the rear camera may receive an external multimedia datum while the vehicle alarming device 1400 is in an operation mode, such as a photographing mode or a video mode. Each of the front and rear cameras may be a fixed optical lens system or have a focus and optical zoom capability.

The audio component 1410 is configured to output and/or input audio signals. For example, the audio component 1410 includes a microphone configured to receive an external audio signal when the vehicle alarming device 1400 is in an operation mode, such as a call mode, a recording mode, and a voice recognition mode. The received audio signal may be further stored in the memory 1404 or transmitted via the communication component 1416. In some embodiments, the audio component 1410 further includes a speaker to output audio signals.

The I/O interface 1412 provides an interface between the processing component 1402 and peripheral interface modules, such as a keyboard, a click wheel, buttons, or the like. The buttons may include, but are not limited to, a home button, a volume button, a starting button, and a locking button.

The sensor component 1414 includes one or more sensors to provide status assessments of various aspects of the vehicle alarming device 1400. For instance, the sensor component 1414 may detect an open/closed status of the vehicle alarming device 1400, relative positioning of components, e.g., the display and the keypad, of the vehicle alarming device 1400, a change in position of the vehicle alarming device 1400 or a component of the vehicle alarming device 1400, a presence or absence of user's contact with the vehicle alarming device 1400, an orientation or an acceleration/deceleration of the vehicle alarming device 1400, and a change in temperature of the vehicle alarming device 1400. The sensor component 1414 may include a proximity sensor configured to detect the presence of nearby objects without any physical contact. The sensor component 1414 may also include a light sensor, such as a CMOS or CCD image sensor, for use in imaging applications. In some embodiments, the sensor component 1414 may also include an accelerometer sensor, a gyroscope sensor, a magnetic sensor, a pressure sensor, a microwave sensor or a temperature sensor.

The communication component 1416 is configured to facilitate communication, wired or wirelessly, between the vehicle alarming device 1400 and other devices. The vehicle alarming device 1400 can access a wireless network based on a communication standard, such as WiFi, 2G, 3G, or 4G, or a combination thereof. In one exemplary embodiment, the communication component 1416 receives a broadcast signal or broadcast associated information from an external broadcast management system via a broadcast channel. In one exemplary embodiment, the communication component 1416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the vehicle alarming device 1400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing a method consistent with the present disclosure, such as one of the above-described exemplary methods.

In exemplary embodiments, there is also provided a non-transitory computer-readable storage medium comprising instructions, such as comprised in the memory 1404, executable by the processor 1420 in the vehicle alarming device 1400, for performing a method consistent with the present disclosure, such as one of the above-described exemplary methods. For example, the non-transitory computer-readable storage medium may be a ROM, a RAM, a CD-ROM, a magnetic tape, a floppy disc, an optical data storage device, or the like.

According to the present disclosure, a vehicle can perform alarming when a person or an article in the vehicle is removed from the vehicle, and thus can prevent the person or article from being lost. Therefore, safety of the person or article is improved.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A vehicle alarming method, comprising:
   measuring a pressure value of a vehicle through a pressure sensor, the pressure value being measured by detecting an entire load of the vehicle through a wheel pressure sensor arranged on a wheel of the vehicle, the entire load of the vehicle serving as the pressure value of the vehicle;
   detecting whether a paired terminal corresponding to the vehicle is within a preset distance range when the pressure value of the vehicle is reduced to a preset pressure range, whether the paired terminal corresponding to the vehicle is within the preset distance range being detected by detecting whether the paired terminal corresponding to the vehicle is within the preset distance range when the entire load of the vehicle is reduced to a preset pressure range that is set taking into consideration of a weight of the vehicle and a weight of a person or an article in the vehicle;
   performing alarming when the paired terminal is not detected, wherein performing alarming includes sending an alarming message to the paired terminal through a mobile network or the Internet and sounding an alarm;
   cancelling the alarm when a distance between the vehicle and the paired terminal is determined to be less than a preset distance range threshold;
   sending another alarming message to the paired terminal when the paired terminal is detected.

2. The method of claim 1, wherein measuring the pressure value of the vehicle through the pressure sensor includes:
   detecting a load of a cabin of the vehicle through a cabin pressure sensor arranged on the cabin, the load of the cabin serving as the pressure value of the vehicle.

3. The method of claim 2, wherein detecting whether the paired terminal corresponding to the vehicle is within the preset distance range when the pressure value of the vehicle is reduced to the preset pressure range includes:
   detecting whether the paired terminal corresponding to the vehicle is within the preset distance range when the load of the cabin is reduced to a preset pressure range that is set taking into consideration a weight of the cabin and a weight of a person or an article in the cabin.

4. The method of claim 1, wherein detecting whether the paired terminal corresponding to the vehicle is within the preset distance range includes:
   detecting whether the paired terminal corresponding to the vehicle is within the preset distance range through Bluetooth or wireless fidelity (Wi-Fi).

5. The method of claim 1, further comprising, after performing alarming:
   canceling alarming when an alarm cancel message from the paired terminal is received.

6. The method of claim 1, further comprising, when the paired terminal is within the preset distance range:
   establishing a connection with the paired terminal through Bluetooth or wireless fidelity (Wi-Fi) when the paired terminal is detected; and
   sending a reminder message to the paired terminal via the connection.

7. The method of claim 1, further comprising, before detecting the pressure value of the vehicle:
   performing pairing with at least one preset terminal, one of the at least one preset terminal, after being paired, serving as the paired terminal corresponding to the vehicle.

8. The method of claim 1, wherein detecting whether the paired terminal is within the preset distance range includes detecting whether a paired smart phone or a paired wearable smart device is within the preset distance range.

9. A vehicle alarming device, comprising:
   a processor; and
   a memory storing instructions that, when executed by the processor, cause the processor to:
   measure a pressure value of a vehicle through a pressure sensor, the pressure value being measured by detecting an entire load of the vehicle through a wheel pressure sensor arranged on a wheel of the vehicle, the entire load of the vehicle serving as the pressure value of the vehicle;
   detect whether a paired terminal corresponding to the vehicle is within a preset distance range when the pressure value of the vehicle is reduced to a preset pressure range, whether the paired terminal corresponding to the vehicle is within the preset distance range being detected by detecting whether the paired terminal corresponding to the vehicle is within the preset distance range when the entire load of the vehicle is reduced to a preset pressure range that is set taking into consideration of a weight of the vehicle and a weight of a person or an article in the vehicle;
   perform alarming when the paired terminal is not detected, by sending an alarming message to the paired terminal through a mobile network or the Internet and sounding an alarm;
   cancel the alarm when a distance between the vehicle and the paired terminal is determined to be less than a preset distance range threshold;
   send another alarming message to the paired terminal when the paired terminal is detected.

10. The vehicle alarming device according to claim 9, wherein the instructions further cause the processor to:
    detect a load of a cabin of the vehicle through a cabin pressure sensor arranged in the cab, the load of the cabin serving as the pressure value of the vehicle.

11. The vehicle alarming device according to claim 10, wherein the instructions further cause the processor to:
    detect whether the paired terminal corresponding to the vehicle is within the preset distance range when the load of the cabin is reduced to a preset pressure range set taking into consideration a weight of the cabin and a weight of a person or an article in the cabin.

12. The vehicle alarming device according to claim 9, wherein the instructions further cause the processor to:
    detect whether the paired terminal corresponding to the vehicle is within the preset distance range through Bluetooth or wireless fidelity (Wi-Fi).

13. A non-transitory computer-readable storage medium having stored therein instructions that, when executed by a processor of a vehicle alarming device installed on a vehicle, cause the device to:
  measure a pressure value of the vehicle through a pressure sensor, the pressure value being measured by detecting an entire load of the vehicle through a wheel pressure sensor arranged on a wheel of the vehicle, the entire load of the vehicle serving as the pressure value of the vehicle;
  detect whether a paired terminal corresponding to the vehicle is within a preset distance range when the pressure value of the vehicle is reduced to a preset pressure range, whether the paired terminal corresponding to the vehicle is within the preset distance range being detected by detecting whether the paired terminal corresponding to the vehicle is within the preset distance range when the entire load of the vehicle is reduced to a preset pressure range that is set taking into consideration of a weight of the vehicle and a weight of a person or an article in the vehicle;
  perform alarming when the paired terminal is not detected, wherein performing alarming includes sending an alarming message to the paired terminal through a mobile network or the Internet and sounding an alarm;
  cancel the alarm when a distance between the vehicle and the paired terminal is determined to be less than a preset distance range threshold;
  send another alarming message to the paired terminal when the paired terminal is detected.

* * * * *